United States Patent [19]

Boccanfuso

[11] Patent Number: 5,609,289
[45] Date of Patent: Mar. 11, 1997

[54] METHOD OF MAKING SQUARE JEWELRY BEADS

[75] Inventor: Ronald J. Boccanfuso, West Warwick, R.I.

[73] Assignee: Precision Etchings & Findings, Inc., Warwick, R.I.

[21] Appl. No.: 456,549

[22] Filed: Jun. 1, 1995

[51] Int. Cl.⁶ .................................................. B23K 1/008
[52] U.S. Cl. ..................... 228/173.6; 29/896.4; 228/212
[58] Field of Search ........................... 29/896.4, 896.41, 29/896.411; 228/212, 173.6

[56] References Cited

U.S. PATENT DOCUMENTS

| | | | |
|---|---|---|---|
| 277,339 | 5/1883 | Pine | 228/173.6 X |
| 1,093,698 | 4/1914 | Heaton | 29/896.4 |
| 4,459,829 | 7/1984 | Richard | 63/12 |
| 4,545,761 | 10/1985 | Cartwright et al. | 228/212 X |
| 5,372,296 | 12/1994 | Konecke et al. | 228/212 X |

*Primary Examiner*—Kenneth J. Ramsey
*Attorney, Agent, or Firm*—Salter & Michaelson

[57] ABSTRACT

An article of gold jewelry of hollow construction is lightweight and constructed and arranged for being secured to and slidably movable with respect to a chain or the like. The article has two interfitting pieces of identical construction which are assembled together for forming the article. Each piece is of U-shaped construction and has peripheral edges with step formations formed along the peripheral edges. The arrangement is such that when the pieces are in interfitting, assembled relation, adjacent and abutting edges with the step formations interlock with each other and are welded together to achieve a unitary, enclosed structure. A method for making the article of gold jewelry is also disclosed.

5 Claims, 5 Drawing Sheets

METHOD OF MAKING SQUARE JEWELRY BEADS

BACKGROUND AND SUMMARY OF THE INVENTION

This invention relates generally to articles of gold jewelry, and more particularly to an article of gold jewelry in the form of a bead designed to be attached to a chain with other such beads whereupon the wearer of the chain may spell their name, for example. This invention also relates to a method for making such articles.

In the past, square-shaped articles of jewelry or beads having one of its outer surfaces marked with indicia (e.g., a letter) have been sold with other such articles which, when combined, can spell a person's name, for example. Such beads have openings formed therein so that the beads may be secured to a chain or the like which is worn around the person's neck or wrist. The chain and beads are sold in jewelry stores and novelty shops and have been very successful commercially. Because such beads are usually made by a casting process, they are relatively heavy and expensive when made of gold. There is presently a need for gold articles of jewelry in the form of such beads which are less expensive than the above-described solid cast beads. There is also a need for a method of making such articles of jewelry which is cost-efficient, simple to follow, and economically feasible.

The instant invention is directed to an improved article of gold jewelry of hollow construction which is relatively lightweight and constructed and arranged for being secured to and slidably movable with respect to a chain or the like. The article comprises two interfitting pieces of identical construction which are assembled together for forming the article. Each piece is of U-shaped construction and has peripheral edges with step formations formed therein. The arrangement is such that when the pieces are in interfitting, assembled relation, adjacent and abutting edges with the step formations interlock with each other and are welded together to achieve a unitary, enclosed structure. The article has six walls, two of the walls being in parallel relation and having openings formed therein for receiving the chain therethrough. At least one of the walls not having the openings has an outer surface with indicia (e.g., a letter, number or symbol) disposed thereon.

Another aspect of the present invention is the method for making the article of jewelry comprising the steps of: (a) providing two thin, rectangular pieces of gold solder flush material, each piece having four peripheral edges each with a step formation formed therein; (b) bending each piece to a U-shaped configuration, each piece having a pair of parallel walls and a middle wall extending from opposite edges of the parallel walls; (c) assembling the two pieces together to create an enclosed cube structure whereby the step formations of the peripheral edges of the two pieces interlock to form a continuous joint between the mating edges of the two pieces; (d) inserting the assembled structure in a fixture having at least one opening sized for receiving the assembled structure therein, the opening having a slight interference fit with the assembled structure for securely positioning the assembled structure in such a manner that abutting peripheral edges of the pieces engage one another, the fixture being made of heat-resistant material; (e) heating the fixture to a sufficient temperature so that the continuous joints between the assembled structure weld together for fixedly securing the two pieces together thereby forming an article of jewelry; and (f) removing the article of jewelry from the fixture. The method also comprises the steps of disposing a plate of gold solder flush material between two film sheets having black markings thereon, imaging the black markings of the film sheets onto the plate, and applying suitable chemicals (e.g., iodine) to the plate for engraving the plate at locations where the imaged black markings are applied thereto. This part of the method is known as chemical milling. The film sheets each comprise a matrix of black markings, the arrangement being such that when disposing the plate between the two film sheets, the matrices of black markings of the film sheets are aligned with each other so that when the step of applying chemicals to the plate is completed, the pieces are separated from one another at the location of the aligned black markings. The bottom film sheet has a matrix of black markings approximately twice as thick as the other film sheet thereby resulting in forming the step formation at the peripheral edges of each piece.

Accordingly, among the several objects of the present invention are the provision of a lightweight article of jewelry fabricated from gold and of hollow construction, the article being adapted to be secured to a chain or the like and combined with other articles for spelling the wearer's name, for example; and the provision of such an article of jewelry which is sturdy in construction, attractive in appearance, and cost-efficient to manufacture.

Also among the several objects of the present invention are the provision of an improved method for making the article which requires substantially less gold material in making the article than is required by prior art casting methods thereby lessening the cost of the article; the provision of such an improved method which produces an article of jewelry having a neat, attractive appearance; and the provision of such an improved method which is easy to perform and cost-efficient.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENT

Figure 9:
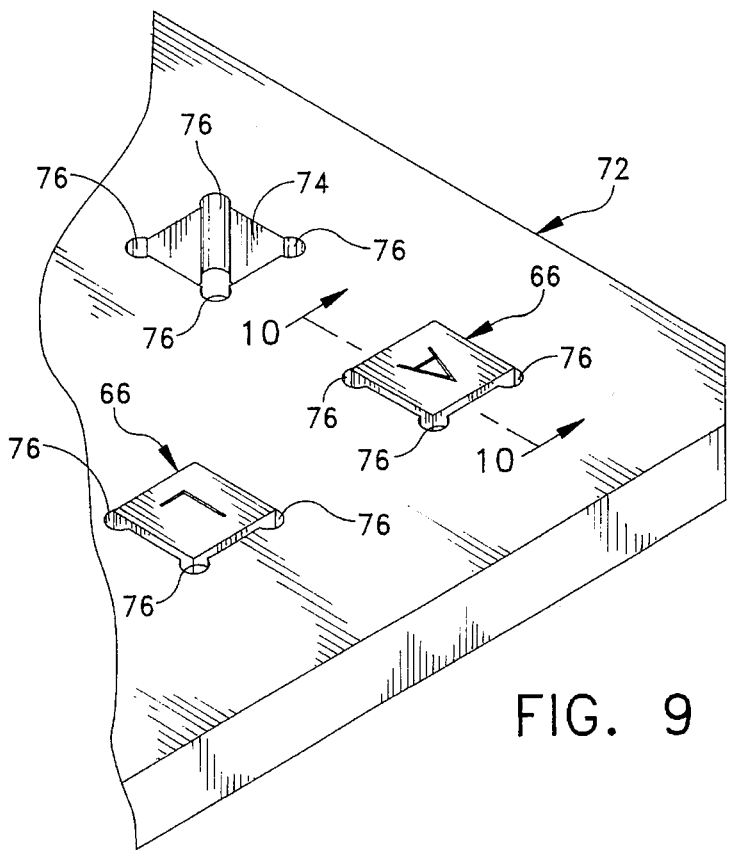
FIG. 9 is a fragmentary perspective view of several assembled pieces positioned in a fixture for heat treatment.
Figure 10:
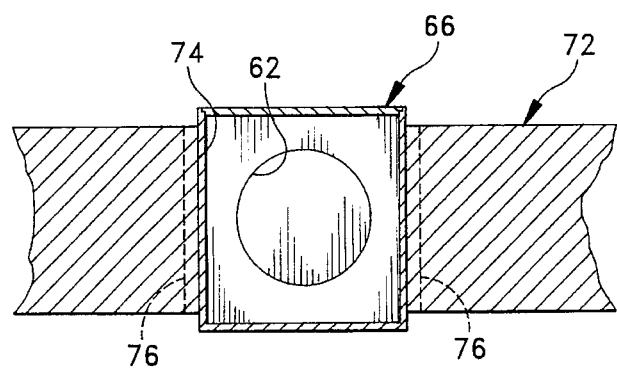
FIG. 10 is a cross-sectional view taken along line 10—10 of FIG. 9.
Figure 11:
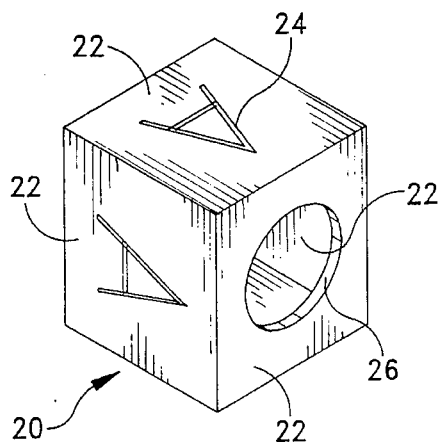
FIG. 11 is a perspective view of a finished article of jewelry.
Figure 12:
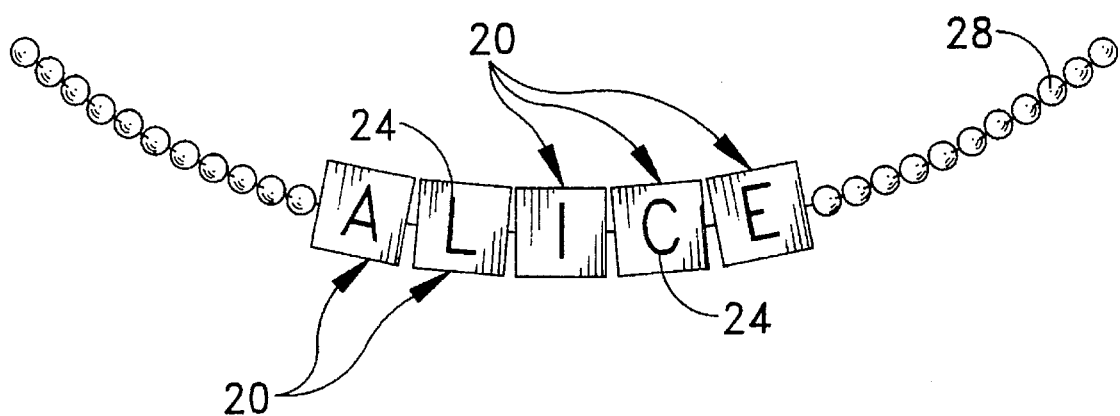
FIG. 12 is an elevational view of several articles of jewelry on a chain.

Referring now to the drawings, FIGS. 1–10 show the sequential steps of a method of the present invention for making an article of jewelry, generally indicated at 20, which is illustrated in FIG. 11. Referring to FIGS. 11 and 12, the article of jewelry 20 is in the form of a square bead having six walls each indicated at 22, at least one of the walls 22 having an outer surface with indicia 24 disposed thereon (e.g., a letter such as the letter "A" illustrated in FIG. 11). Each bead 20 is of hollow construction wherein two of the walls 22 in parallel relation have aligned openings 26 formed therein which are sized for receiving a chain 28 therethrough (see FIG. 12). In the shown embodiment, one of the solid walls 22 has indicia 24 formed on its outer surface. Preferably, the beads 20 are made from gold; however, they can also be made from any other precious or non-precious metals such as silver or bronze. As shown in FIG. 12, several beads 20 each having different letters can be secured to the chain 28 to form a wearer's name (such as "ALICE"), for example. The beads 20 and chain 28 are designed to be sold as novelty items wherein the purchaser selects the chain 28 and the beads 20 necessary to form a name or other word.

Prior art beads of this type are sold in jewelry stores and novelty shops and are well-known in the industry. Such beads are manufactured by casting in molds suitably designed to form the aligned openings and indicia on at least one outer wall. Where made of gold, these beads are relatively expensive since there is a significant amount of gold required to cast them which increases their cost to a point where the retail price becomes extremely high. The article of jewelry 20 of the present invention differs from these prior art casted beads in that the beads are hollow and have walls which are relatively thin. More specifically, the weight of the bead 20 of the present invention is at least ten times less than the weight of a similar casted bead. As will be discussed in greater detail below, the bead 20 is manufactured by a novel method which enables the bead to be hollow and to have relatively thin walls while maintaining the structural integrity of the bead.

Figure 1:
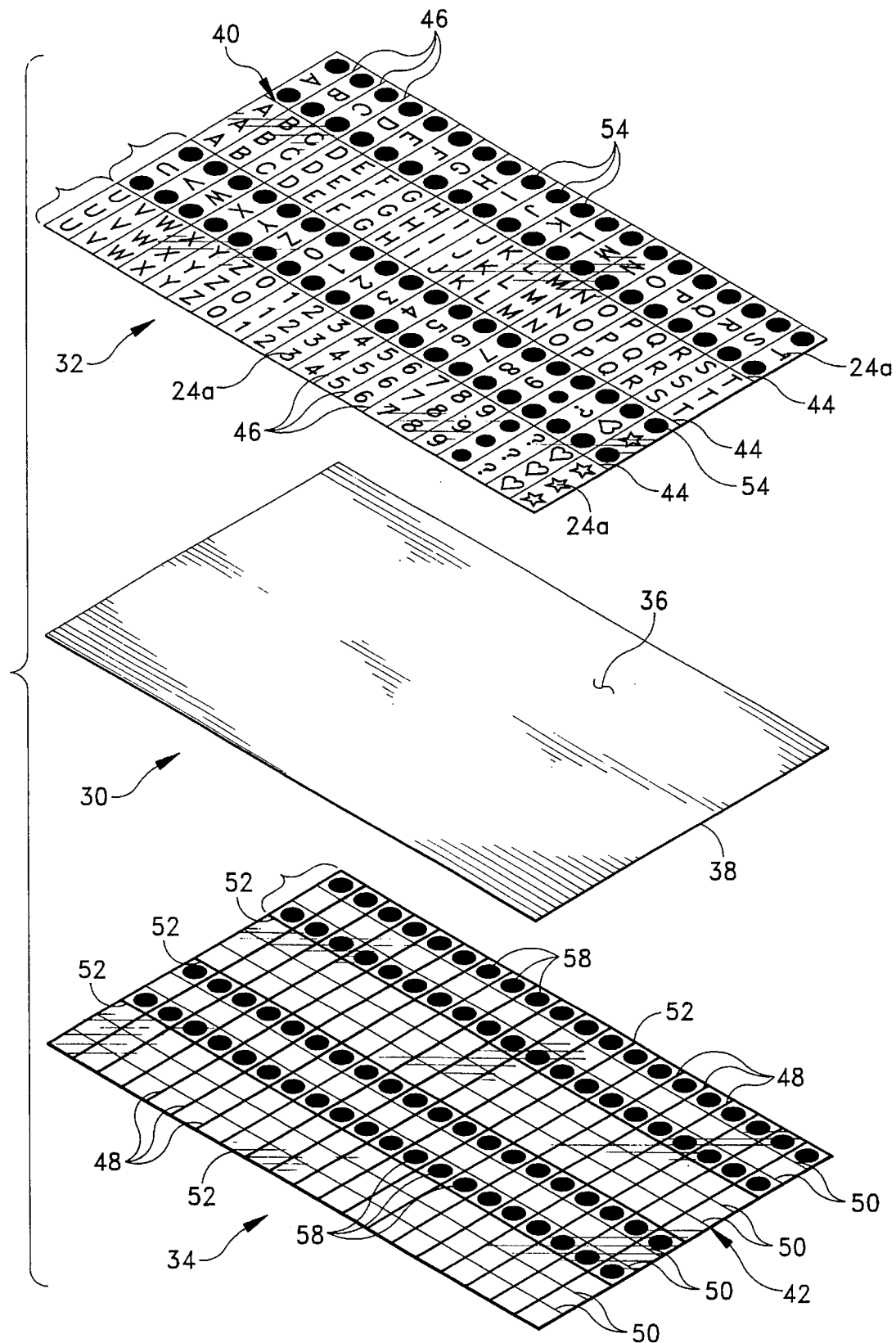
FIG. 1 is an exploded perspective view of a plate and a pair of film sheets used in a photo engraving or chemical milling process of the method of the present invention in a pre-assembled relation.

Turning now to FIGS. 1–10, and more particularly to FIG. 1, there is illustrated a rectangular plate of gold solder flush material, generally indicated at 30, disposed between two rectangular film sheets, the top film sheet being generally indicated at 32 and the bottom film sheet being generally indicated at 34. The top film sheet 32 engages a top surface 36 of the plate 30 and the bottom film sheet 34 engages a bottom surface 38 of the plate 30. The plate 30 and film sheets 32, 34 are identically sized so that when sandwiched together, the outer peripheries of the plate 30 and film sheets 32, 34 are in registry.

Figure 2:
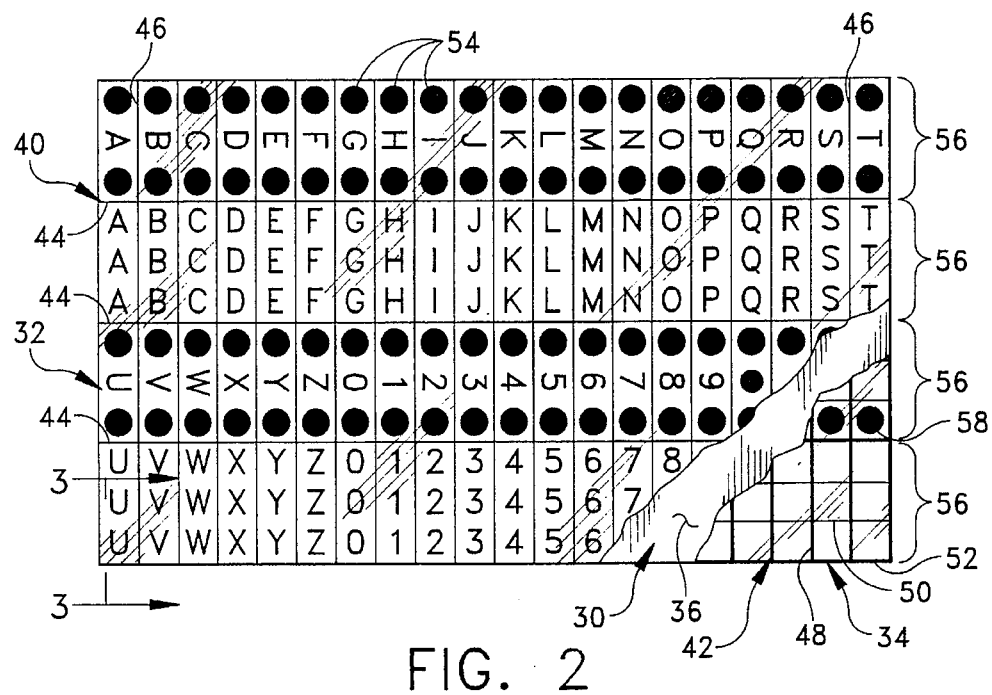
FIG. 2 is a top plan view of the assembled portions of FIG. 1 with a part of the top film sheet broken away to show a part of the plate and a part of the bottom film sheet underlying the plate.
Figure 3:
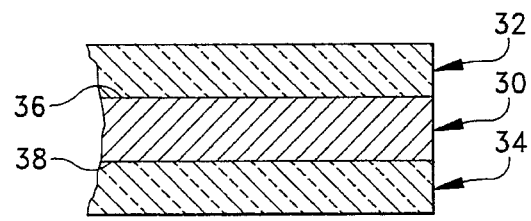
FIG. 3 is a cross-sectional view taken along line 3—3 of FIG. 2.
Figure 4:
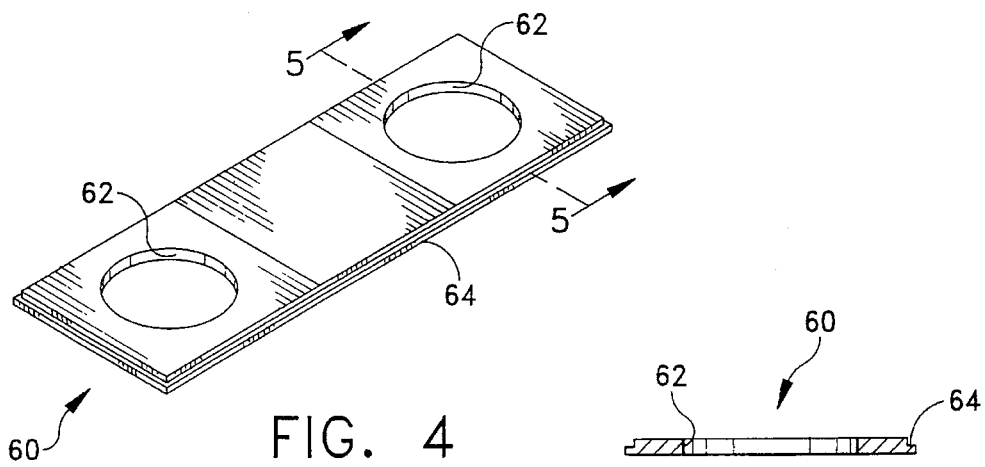
FIG. 4 is a perspective view of a bottom surface of a finished piece after the photo engraving process.

The top film sheet comprises a matrix of black markings, generally indicated at 40, which are aligned with a matrix of black markings, generally indicated at 42, of the bottom film sheet 34 so that when assembled in the manner illustrated in FIG. 2, the matrices 40, 42 of the film sheets 32, 34 are aligned. More particularly, the matrix 40 of the top film sheet 32 includes a plurality of horizontal lines, each designated 44, and a plurality of vertical lines, each designated 46. The matrix 42 of the bottom film sheet includes a plurality of relatively thick vertical lines 48 which register with the vertical lines 46 of the matrix 40 of the top film sheet 32 when arranged in the manner illustrated in FIGS. 1 and 2. Moreover, the matrix 42 of the bottom film sheet 34 further includes a plurality of relatively narrow horizontal lines 50 and a plurality of relatively thick horizontal lines 52. The purpose for these relatively thick vertical lines 48 and horizontal lines 52 will be discussed below.

As shown in FIG. 1 the top film sheet 32, in addition to the horizontal and vertical lines 44, 46 of the matrix 40, includes a plurality of letters, numbers and symbols, each indicated at 24a (i.e., indicia), and a plurality of darkened circles, each indicated at 54. These indicia 24a and darkened circles 54 are arranged or grouped together in threes as indicated by brackets 56. The purpose of grouping the indicia 24a together will become apparent as the description of the method continues. The bottom film sheet 34 includes only darkened circles 58 which are in registry with the darkened circles 54 of the top film sheet 32 when the plate 30 and film sheets 32, 34 are assembled together.

After disposing the plate 30 between the top and bottom film sheets 32, 34, the black markings (i.e., matrices 40, 42, darkened circles 54, 58, and indicia 24a) of the film sheets 32, 34 are imaged onto the plate 30 by exposing the film sheets 32, 34 to high intensity light. This process is known as photo imaging and is well-known in the art of photo engraving or chemical milling. Once the black markings are applied to the top and bottom surfaces 36, 38 of the plate 30, suitable chemicals are applied to the plate 30 which engrave or mill the plate 30 only at locations where the imaged black markings exist. More particularly, the chemicals remove the material of the plate 30 having the imaged black markings applied thereon. For gold solder flush material, the chemical applied to the plate is iodine. For silver solder flush material, the suitable chemical is ferric nitrate.

The chemical is of sufficient strength to remove approximately one-half the thickness of the plate 30 which is covered by the imaged black markings. Thus, at locations where the horizontal and vertical lines of the aligned matrices 40, 42 imaged onto the plate are in registry, the plate 30 is divided and broken up into a plurality of rectangular pieces (e.g., eighty), each being generally indicated at 60 in FIGS. 4–8. It should be noted that the top surface 36 of the plate 30 having the imaged black markings of the letters, numbers and symbols applied thereon have these indicia 24a engraved therein. Also, the aligned darkened circles 54, 58 imaged on the top and bottom surfaces 36, 38 of the plate 30, when applied with the suitable chemicals, form openings 62 in the pieces 60 as illustrated clearly in FIG. 4. (It should be noted that openings 62 of FIGS. 4–10 are the same openings 26 formed in the bead 20 shown in FIG. 11.) As shown, the narrow horizontal lines 50 formed in the bottom surface 38 provide score or bend lines dividing each piece 60 into three squares or walls 22. After being engraved, these narrow horizontal lines 50, for each piece 60, form the bend lines (see FIG. 4) which assist the person assembling the pieces in bending them.

Figure 5:
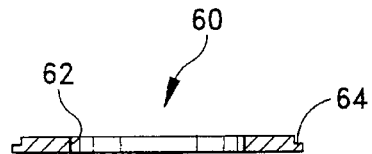
FIG. 5 is a cross-sectional view taken along line 5—5 of FIG. 4.
Figure 6:
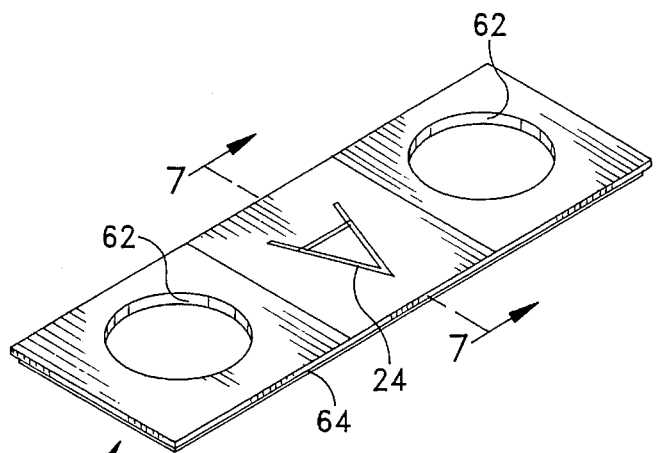
FIG. 6 is a perspective view of a top surface of the finished piece of FIG. 4.
Figure 7:
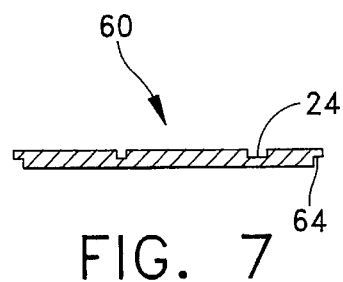
FIG. 7 is a cross-sectional view taken along line 7—7 of FIG. 6.

Referring now to FIGS. 4–7, the bottom film sheet 34 produces a step formation 64 along the peripheral edges of each piece 60. The step formations 64 are a result of the relatively thick vertical and horizontal lines 48, 52 of the matrix 42 of the bottom film sheet 34 which removes a portion of the piece 60 around its edges after engraving. The step formations 64 facilitate the assembly of two pieces 60 for producing the bead 20 of the present invention. FIGS. 5 and 7 clearly show the step formations 64 in cross section. These figures also illustrate the opening 62 created by the aligned darkened circles 54, 58 and the formation of the indicia 24, respectively.

It should be understood that the pieces 60 used to make the article of jewelry 20 of the present invention could be formed by other processes rather than the chemical milling process described above. For example, for larger articles of jewelry, each piece can be machined to achieve a finished product. However, for relatively small, thin articles, chemical milling produces the best results while being cost-efficient to perform.

Figure 8:
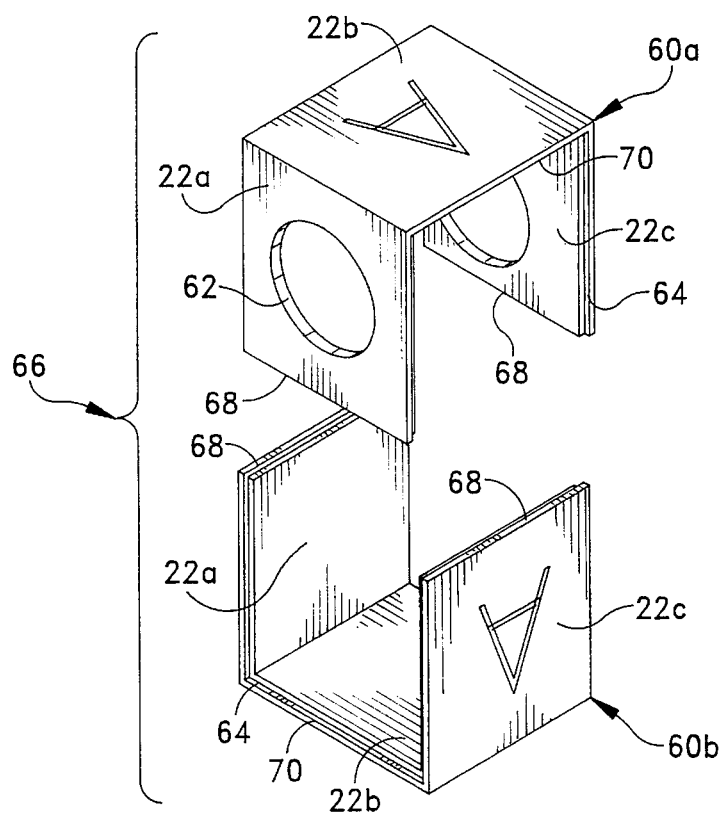
FIG. 8 is a perspective view of the two pieces used to make the article of jewelry prior to their assembly.

Before assembling two pieces 60 together, each piece is bent to a U-shaped configuration as illustrated in FIG. 8. A suitable tool may be provided for bending each piece 60 along the two bend lines which divide the piece into three equal sized walls 22. As shown in FIG. 8, the two outer walls 22a and 22c extend from opposite sides of a middle wall 22b, the outer walls 22a, 22b being bent perpendicularly with respect to the middle wall 22b. Once bent, two pieces 60 are assembled in the manner illustrated in FIG. 8 to form a hollow enclosed cube structure, generally indicated at 66 in FIGS. 8–10, having thin walls 22 thereby requiring less gold than prior cast beads. Preferably, one of the pieces 60 (e.g., the upper piece illustrated in FIG. 8) has the two aligned openings 62 formed in parallel walls 22 which receive the chain 28 therethrough. The solid wall 22 of this piece has indicia 24 engraved on its outer surface (e.g., the letter "A"). The other piece 60 (e.g., the lower piece of FIG. 8) has three solid walls 22, each with indicia 24 provided on its outer surface.

The two pieces 60 are assembled in such a manner that the step formations 64 of the peripheral edges of the two pieces 60 interlock to form a continuous joint between the mating edges of the two pieces. FIG. 10 illustrates the interlocking relationship of the step formations 64 of the mating edges of the two pieces 60. Referring to FIG. 8, for each piece 60a and 60b, the end edges 68 of the two outer walls 22a, 22c of one piece 60a engage the lateral edges 70 of the middle wall 22b of the other piece 60b and end edges 68 of the two outer walls 22a, 22c of the other piece 60b engage the lateral edges 70 of the middle wall 22b of the other piece 60a. The mating edges of the two pieces 60a, 60b assume what is commonly referred to in the building industry as a rabbet type joint.

Once assembled, the assembled structures 66 are inserted in a fixture, generally indicated at 72, having a plurality of generally rectangular openings 74 sized for receiving the assembled structures 66 therein. Preferably, the fixture 72 is fabricated from heat-resistant material, such as ceramic or steel material. Each fixture opening 74 makes a relatively tight fit with the assembled structure 66 for securely positioning the structure 66 therein so that the abutting step formations 64 of the pieces engage one another. FIG. 9 illustrates two assembled structures 66 received by respective openings 74 of the fixture 72. As shown, each fixture opening 74 has generally circular cut-outs 76 at its four corners for providing a sufficient amount of resiliency and space to enable the removal of the structure 66 from the opening 74.

After inserting the assembled structures 66 in the openings 74 of the fixture 72, the fixture 72 is then heated to a sufficient temperature so that the continuous joints between the pieces 60 of the assembled structures 66 are welded for fixedly securing them together. Since the pieces 60 of the assembled structures 66 are made from gold solder flush material, the material has the ability to deform and create a weld at the junction of the two pieces 60 along the step formations 64 subject to the application of sufficient heat. Once heated, the fixture 72 is then cooled until the articles 20 can be removed therefrom 72 by simply pressing them axially through the openings 74 at one side thereof.

It should be noted that the method of the present invention produces a bead 20 having much less gold than prior art cast beads, which significantly decreases the cost of the beads.

Also, since the method does not require complicated molds or casting, the cost of performing the method as compared with casting, is considerably lower.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method for making an article of gold jewelry of hollow construction comprising the steps of:

(a) providing two thin, rectangular pieces of solder flush material, each piece having four peripheral edges each with a step formation formed therein;

(b) bending each piece to a U-shaped configuration so as to form a piece having a pair of parallel walls and a middle wall joining the parallel walls;

(c) assembling the two pieces together to create a hollow enclosed structure whereby the step formations of the peripheral edges of the two pieces interlock to form a continuous joint between the mating edges of the two pieces;

(d) inserting the assembled structure in a fixture having at least one opening sized for simply receiving the assembled structure therein for securely positioning the assembled structure in such a manner that abutting peripheral edges of the pieces engage one another, said mold being made from heat-resistant material;

(e) heating the fixture to a sufficient temperature so that the continuous joints between the assembled structure weld together for fixedly securing the two pieces together thereby forming an enclosed, hollow article of jewelry; and (f) removing the article of jewelry from the fixture.

2. A method as set forth in claim 1, said step of providing the two pieces comprising the steps of:

disposing a plate of gold, solder flush material between two film sheets with black markings;

imaging the black markings of the film sheets onto the plate; and applying suitable chemicals to the plate which engrave the plate at locations where the imaged black markings are applied thereto.

3. A method as set forth in claim 2, said film sheets each comprising a matrix of black markings, the arrangement being such that when disposing the plate between the two film sheets, the matrices of black markings of the film sheets are aligned with each other so that when said step of applying chemicals to the plate is completed, the pieces are separated from one another at the location of the aligned black markings.

4. A method as set forth in claim 3, said one sheet having its matrix of black markings approximately twice as thick as the other sheet thereby resulting in forming a step formation at the peripheral edges of each piece.

5. A method as set forth in claim 2, said plate comprising gold solder flush material and said chemicals comprising iodine.

\* \* \* \* \*